United States Patent [19]

Brooks

[11] 4,162,683

[45] Jul. 31, 1979

[54] ANIMAL FEEDER USING MAGNETICALLY BIASED SWITCH

[75] Inventor: Cletus A. Brooks, Onsted, Mich.

[73] Assignee: Selective Feeder Company, Onsted, Mich.

[21] Appl. No.: 808,992

[22] Filed: Jun. 21, 1977

[51] Int. Cl.² ............................................. A01K 5/02
[52] U.S. Cl. .............................. 119/51 R; 119/52 AF
[58] Field of Search ............. 119/51 R, 56 R, 52 AF; 335/207, 188; 340/166 S

[56] References Cited

U.S. PATENT DOCUMENTS

| 2,809,249 | 10/1957 | Crissinger | 335/207 |
| 3,187,129 | 6/1965 | McBrian | 335/207 X |
| 3,205,323 | 9/1965 | Deshautreaux, Jr. | 335/207 |
| 3,557,757 | 1/1971 | Brooks | 119/51 R |

*Primary Examiner*—Hugh R. Chamblee
*Attorney, Agent, or Firm*—Beaman & Beaman

[57] ABSTRACT

The invention pertains to animal feeders of the automatic type wherein animals, such as dairy cows, may be selectively fed different feed supplements from a pair of feed dispensers wherein a feed transfer actuator worn by the animal selectively energizes feed transfer means upon the animal placing its head within a feed trough. In the practice of the invention feed transfer is controlled by an electric switch biased by a magnetic field, the animal worn actuator being capable of influencing the biasing magnetic field, and hence the switch, to actuate the desired feed transfer apparatus. In the preferred embodiment two feed dispensing troughs and transfer devices are utilized and the magnetic field orientation of each device is reversed with respect to the other whereby the animal worn actuator actuates only one feed dispenser of the system, or the animal worn actuator may be of a universal type capable of actuating both feed dispensers.

10 Claims, 19 Drawing Figures

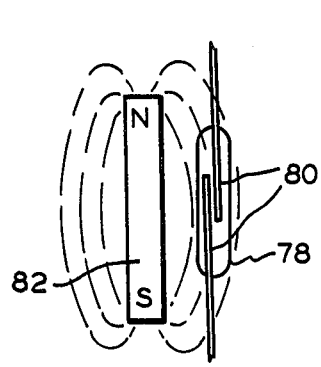 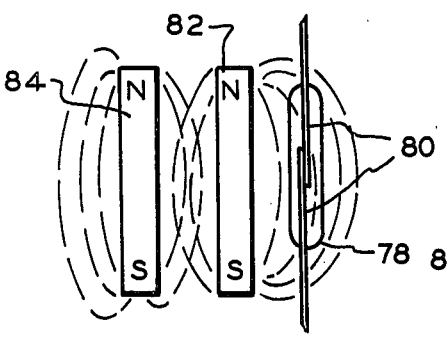 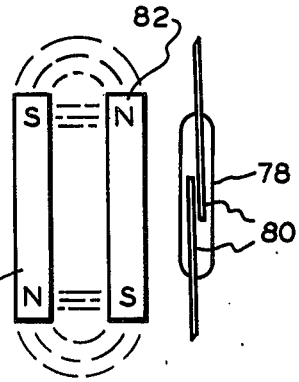
FIG. 11.   FIG. 12.   FIG. 13.
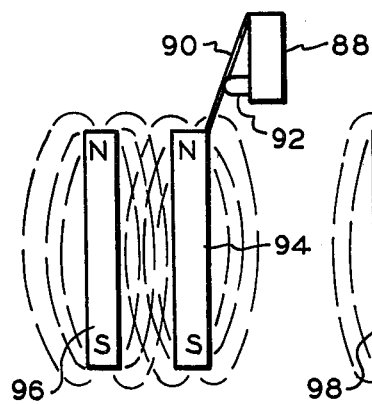 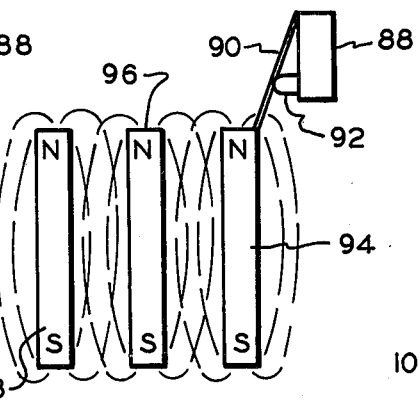 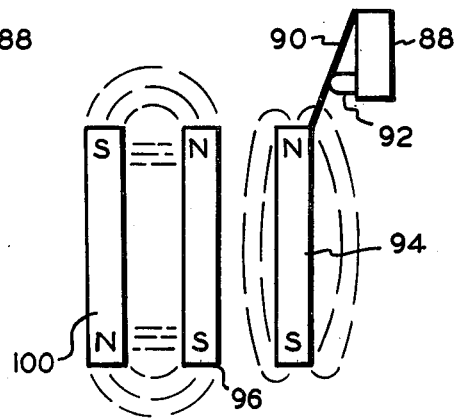
FIG. 14.   FIG. 15.   FIG. 16.
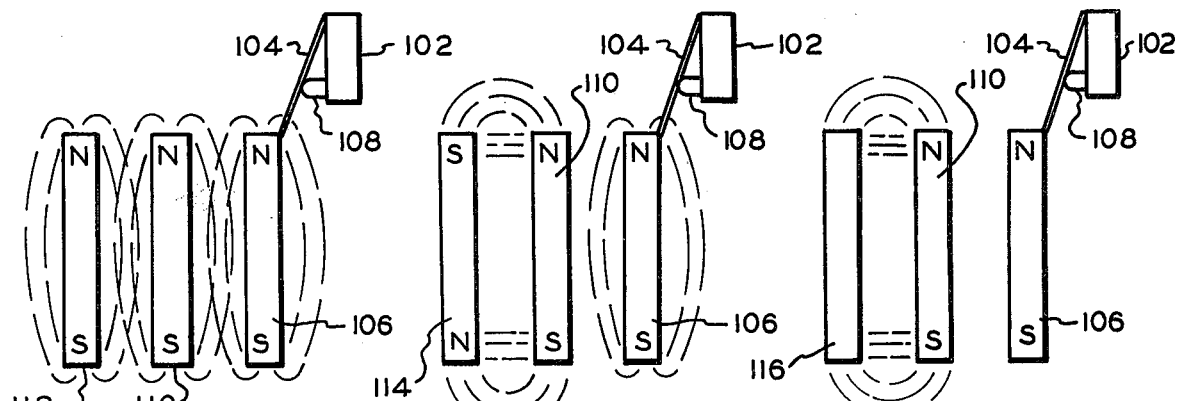
FIG. 17.   FIG. 18.   FIG. 19.

ANIMAL FEEDER USING MAGNETICALLY BIASED SWITCH

BACKGROUND OF THE INVENTION

The invention pertains to the field of selective animal feeders wherein the dispensing of feed is controlled by an actuator worn by the animal to be fed.

In order to achieve maximum milk production in a dairy herd, it is now known to provide automatic feed dispensing apparatus which selectively provides predetermined animals with supplemental feed. Dairy herds are normally free to roam a feed lot between milkings, and by providing selected animals with supplemental feed while within the feed lot may substantially increase the milk production of a particular cow, but because of age, size, and other factors it is often undesirable that all of the animals of the herd receive such supplemental feeding. Also, due to the expense of the supplemental feed it is important that the dispensing thereof be accurately controlled to minimize waste.

A number of prior art devices have been proposed for controlling the selective feeding of animals and many of these devices include sophisticated circuitry and apparatus as disclosed in U.S. Pat. Nos. 3,465,724, 3,541,995 and 3,557,758. Such devices often include feed dispenser actuating means worn by the animal, such as a tuned circuit capable of modifying a transmitted signal, and while such devices are capable of selectively feeding animals the cost and maintenance thereof have placed such devices beyond the availability of all but the larger milk producing operations.

In my U.S. Pat. No. 3,557,757 I have disclosed a relatively inexpensive selective feeder operated by a magnet worn by the animal to be fed, and this patent further discloses additional means for actuating the feed transfer mechanism. Also, U.S. Pat. No. 3,850,145 discloses a relatively inexpensive supplemental feeder for cows wherein a passive device worn by the animal actuates a switch having a magnet mounted thereon for energizing feed dispensing means. While the two patents mentioned above do provide inexpensive selective animal feeders within the availability of the small and medium size dairy farmer, such magnetically controlled devices will only permit operation of a single type of feeder since actuation of the feed transfer means is controlled by the presence or absence of a non-discriminating magnetic field, and the devices disclosed in both of these patents are incapable of permitting two separate feed dispensers to be utilized having separate actuating means wherein the control circuits are capable of distinguishing the characteristics of a magnetic field to selectively control feed dispensing.

SUMMARY OF THE INVENTION

It is an object of the invention to provide a selective feeder system for animals which utilizes two feed dispensers, preferably of identical construction, except for the orientation of the poles of a biasing magnetic field, wherein an oriented permanent magnet or magnetic field conducting element, worn by an animal may be used to selectively operate one of the feed dispensers, or both.

It is a further object of the invention to provide a two-feed dispenser selective feeder system for animals wherein inexpensive means are employed to permit selective operation by a given animal of one or the other dispenser, or if universal actuating means are worn by the animal both dispensers may be operated by a single animal.

An additional object of the invention is to provide a selective animal feeder system utilizing a switch operable between open and closed positions under the influence of a magnetic field wherein the switch contacts are biased to an open condition to deactivate feed dispensing apparatus, and wherein magnetic field influencing means worn by an animal is capable of modifying the biasing magnetic field to permit the switch contacts to close and energize the feed dispensing apparatus.

Yet another object of the invention is to provide a selective animal feeder system utilizing two feeders each having its own dispensing apparatus and feed supply, each feeder utilizing a reed switch having normally closed contacts biased open by a permanent biasing magnet having a predetermined polarity orientation to the vertical whereby a vertically oriented permanent magnet worn by the animal is capable of influencing the biasing magnetic field if the animal's magnet is oriented in a predetermined manner to the vertical. Further, if the animal wears magnetic field conducting means, rather than a permanent magnet, such magnetic field conducting means is capable of so influencing the biasing magnetic field of either feeder so as to operate the same and permit the animal to feed from both dispensers.

In the practice of an embodiment of the invention two feed dispensers and associated feed troughs, preferably of identical construction, are utilized. The feed dispenser includes a bin container for the feed, and transfer means, such as a motor driven screw auger or belt, is used to transfer the feed into a trough during energizing of the motor. The feed trough includes an access opening through which the animal inserts its head, and the lower portion of the access opening includes a panel against which an actuator worn about the animal's neck will be located upon the animal inserting its head into the trough access opening. Controls for the feed transfer motor are located within the feed trough adjacent the inner side of the access opening and include a reed switch having normally closed contacts which open upon being subjected to a magnetic field.

A permanent magnet is disposed adjacent the reed switch in such proximity that the magnetic field thereof will bias the switch contacts open, and the permanent magnet is mounted adjacent to the access opening panel, and preferably incorporated therein. The biasing magnet is of the elongated bar type and is vertically oriented whereby a predetermined pole is located at the upper end of the magnet, while the pole of opposite polarity constitutes the lower magnet end.

The magnetic field influencing device worn by the animal depends from a necklace extending about the animals neck, and either consists of a permanent bar magnet of a length substantially equal to the length of the biasing magnet, or an elongated bar of magnetic field conducting material, such as a ferrous metal, also preferably of a length substantially equal to the length of the biasing magnet. The animal worn magnet, or ferrous bar, is attached to the necklace in such a manner that the device is vertically oriented by gravity, and the device is so positioned with respect to the neck of the animal that the magnet or ferrous bar will be disposed in aligned parallel relationship with the switch biasing magnet. Accordingly, when the animal inserts its head into the trough access opening its magnet or ferrous bar will be disposed adjacent the exterior surface of the access opening panel and the biasing magnet. If a magnet is worn by the animal, and if its upper polarity is opposite to the upper polarity of the switch biasing magnet the magnetic field of the biasing magnet will be "shorted" or attracted to the influencing magnet worn by the animal removing the biasing magnetic field from the reed switch permitting the reed switch contacts to close energizing the feed transfer motor to feed the animal. Animal feeding occurs as long as the animal maintains its head within the feed trough thereby "shorting" the biasing magnet field, and upon the animal withdrawing its head the biasing magnetic field once more will open the reed switch contacts and deenergize the feed transfer motor.

If a permanent magnet is worn by the animal having an upper polarity similar to the upper polarity of the biasing magnet a repelling force between the two magnets exists which does not remove the biasing magnetic field from the reed switch and the reed switch contacts remain open. No feed from that particular dispenser is provided to such animal. However, if this animal proceeds to the second of the feed dispensers wherein the upper polarity of the biasing magnet is opposite to that of the polarity of the biasing magnet of the first dispenser the feed transfer mechanism of the second dispenser will be actuated, as described above, and the animal fed.

If the animal magnetic field influencing device constitutes a ferrous bar, rather than a permanent magnet, this bar, when disposed adjacent the biasing magnet of either of the first or second dispenser will "short" the magnetic field of the biasing magnet away from the reed switch permitting the reed switch contacts to close and energize the feed transfer motor. Thus, an animal wearing a ferrous bar will actuate the feed transfer apparatus of both the first and second dispensers.

In another embodiment of the invention a reed switch may be utilized wherein the contacts are normally open and the magnetic field imposed upon the switch contacts by the biasing magnet alone is insufficient to close the switch contacts. However, when a magnet worn by the animal to be fed is disposed in proximity to the biasing magnet an increased magnetic field may be imposed upon the reed switch sufficient to close the contacts thereof and initiate the operation of the feed transfer apparatus. In this embodiment of the invention the increased magnetic field necessary to close the switch contacts results from poles of like polarity being disposed adjacent each other as the animal-worn magnet is brought into proximity with the fixed biasing magnet.

In another embodiment of the invention a magnetically controlled micro-switch may be utilized rather than a reed switch. In such instance the micro-switch includes an actuating arm upon which a vertically oriented permanent bar magnet is located having upper and lower poles of opposite polarity. A biasing magnet located in the panel below the trough access opening imposes a repelling biasing force upon the switch arm mounted magnet, and the switch actuating arm is biased by a spring within the switch itself, and depending upon whether normally open or normally closed switch contacts are used the switch operation may be selectively regulated by utilizing the effect of the magnetic field worn by the animal when the animal inserts its head into the feed trough. For instance, as the biasing magnet normally imposes a repelling force on the switch magnet, the presence of the animal-worn magnet which further imposes a repelling force on the switch magnet may be used to sufficiently bias the switch magnet and arm away from the biasing magnet to operate the feed transfer mechanism. Conversely, a magnet may be worn by the animal having a polarity vertically reversed with respect to the biasing magnet which causes the field on the biasing magnet to be drawn away from the switch magnet such that spring forces acting upon the switch arm will move the switch arm and magnet sufficiently to permit feed transfer. With this embodiment of the invention it is possible to utilize the magnetic conducting element upon the animal, such as a ferrous bar, to permit universal operation of both feed dispensers regardless of the vertical orientation of the switch magnet poles.

BRIEF DESCRIPTION OF THE DRAWINGS

The aforementioned objects and advantages of the invention will be appreciated from the following description and accompanying drawings wherein:

FIGS. 11 through 13 are schematic views of another embodiment of the invention wherein the reed switch contacts are normally open and are biased closed upon the presence of a magnetic field of predetermined strength, FIG. 11 illustrating the normal condition, FIG. 12 illustrating the reed switch contacts closed, and FIG. 13 illustrating the switch contacts open although an animal-worn magnet is disposed adjacent the biasing magnet, FIGS. 14–16 are schematic views of a further embodiment of the invention utilizing a micro-switch having an actuating lever arm and permanent vertically disposed magnet mounted thereon, FIG. 14 illustrating the normal condition in conjunction with the biasing magnet, FIG. 15 illustrating the conditions prevailing at one condition of proximity of the animal-worn magnet to close the switch, and FIG. 16 illustrating yet another condition of magnetic field during proximity of an animal magnet, and FIGS. 17-19 are schematic views of a micro-switch embodiment wherein the switch is closed under the influence of the switch spring forces, FIG. 17 illustrating the switch open condition during proximity of an animal-worn magnet and FIGS. 18 and 19 illustrating the switch closed condition during proximity of an animal-worn magnet and ferrous bar, respectively.

DESCRIPTION OF THE PREFERRED EMBODIMENT

The concepts of the invention can be used with a single feed dispensing apparatus wherein the biasing magnet and switch relationship simply constitutes control means for regulating the feed transfer apparatus upon the animal inserting its head within the trough access opening. However, the primary advantages of the inventive concepts lie in the ability of the invention to, in an economical manner, permit an animal to selectively and automatically receive feed from one of two supplemental feed dispensers, or in some instances, obtain feed from both dispensers. As the feed dispensing apparatus of both dispensers is identical except for the vertical orientation of the poles of the switch biasing magnet only one feed dispenser is illustrated, and it will be appreciated that in the preferred embodiment two such dispensers are located within the same feed lot and are accessible to all of the animals in the herd.

Figure 1:
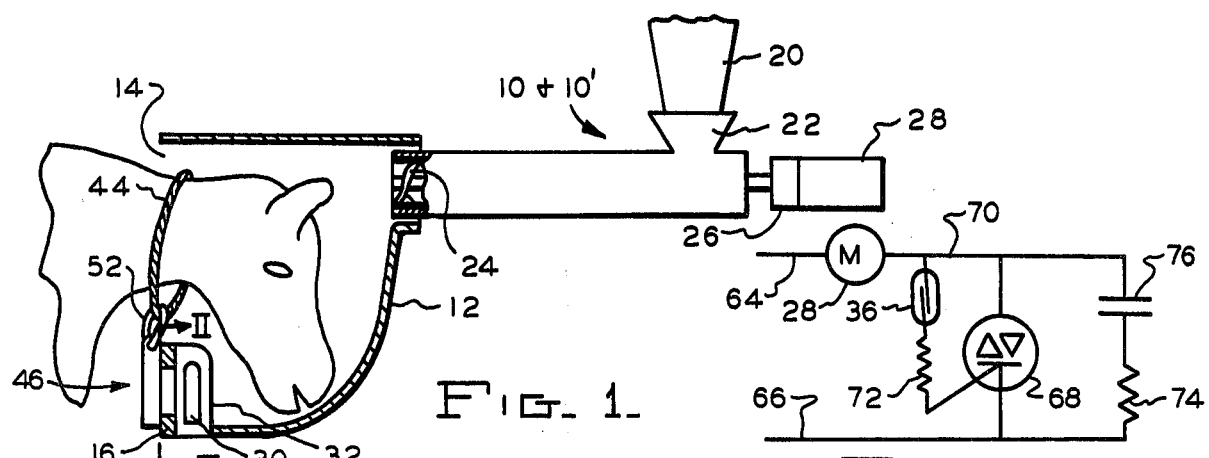
FIG. 1 is a schematic view, partially in section, of one of the feed dispensers which may be used in the practice of the invention, the animal's head being shown inserted within the feed trough.
Figure 2:
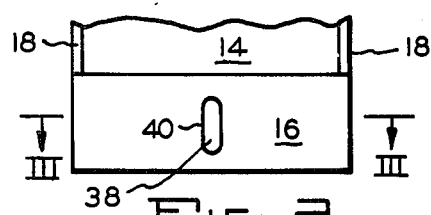
FIG. 2 is a detail, front, elevational view of the access opening panel as taken along Section II—II of FIG. 1.

With reference to FIG. 1, the feed dispensers 10 and 10' include a trough 12 having an access opening 14 through which the animal may readily insert its head. The lower portion of the feed trough access opening is defined by a panel 16 and the width of the feed trough is relatively narrow whereby an animal inserting its head through opening 14 will naturally center its head between the trough sidewalls 18, FIG. 2.

Means are associated with the feed trough for providing a supplemental feed thereto upon energizing of feed transfer mechanism. Such feed dispensing and transfer means may take many forms, such as the one shown in U.S. Pat. No. 3,557,757, and for purpose of illustrating constitutes a bin 20 in which the feed supplement is stored, communicating with the inlet 22 of a screw auger 24 rotatably driven by a transmission 26 powered by electric motor 28. The left end of the screw auger 24 communicates with the interior of the trough 12 wherein operation of the motor 28 will deposit feed from the bin 20 into the feed trough at a rate usually slightly less than the rate at which the animal normally consumes such feed.

The panel 16 is formed of a non-magnetic material, such as aluminum, or could be formed of a synthetic plastic material, and a non-magnetic casing 30 is mounted adjacent the inner surface of the panel and is protected by a housing 32, FIG. 1, whereby the animal will not disturb the casing during feeding. The casing 30 is preferably of a hollow closed construction and internally includes circuit boards 34 and the reed switch 36.

Located within the center of the panel 16 is a switch biasing permanent bar magnet 38, and in the illustrated embodiment the bar magnet is shown embedded into the panel, such as being located within an opening 40 formed in the panel. As will be noted, the opening 40 is of an elongated configuration conforming to the configuration of the bar magnet and both magnet and opening are vertically oriented at a location equidistant from the trough sides 18.

The reed switch 36 is centrally located within the casing 30 adjacent the magnet 38 and is also vertically oriented so as to be substantially parallel to the biasing bar magnet and the center of the reed switch is located on the same horizontal plane as the center of the bar magnet.

Figure 5:
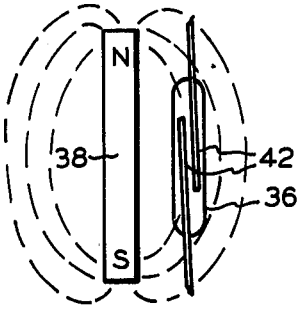
FIG. 5 is a schematic view illustrating the influence of the biasing magnet magnetic field upon the associated reed switch.

The reed switch 36 includes a pair of magnetically influenced contacts 42 which are normally closed to permit an electric circuit to pass through the switch. However, in the afore-described installation, the reed switch is in such proximity to the biasing magnet 38 that the magnetic field of the magnet, as illustrated in FIG. 5, influences the contacts 42 to bias the contacts apart and open the switch circuit. Thus, the permanent bar magnet 38 will always bias the switch 36 to open condition unless the magnetic field of the biasing magnet is influenced in such a manner as to be removed from the switch contacts.

The animals which are to be fed from one of the supplemental feed dispensers 10 or 10', or both, wear a necklace 44 about their neck from which magnetic field influencing means, generally indicate at 46, depend. The magnetic field influencing means in accord with the invention either constitutes a bar magnet, or a bar of magnetic field conducting material, such as a ferrous metal, and these bars may be mounted in various types of protective casings. For instance, in the disclosed embodiment, the casing 48 constitutes a section of aluminum tube in which the bar magnet or ferrous metal is received, and the casing tube is swaged closed at its ends at 50 to maintain the magnet or bar therein. At the upper end of the casing 48 a hook or clip 52 passes through a hole 54 for attaching the means 46 to the animal necklace. As the casing 48 is attached to the animal necklace at one end, gravitational force acting on the casing will naturally orient the casing in a vertical manner, and the length of the necklace 44 and hook 52, is such that when the animal inserts its head into the trough 12 in a natural feeding position, the casing will be disposed adjacent the panel 16 and the biasing magnet 38 mounted therein as shown in FIG. 4.

Figures 3, 10:
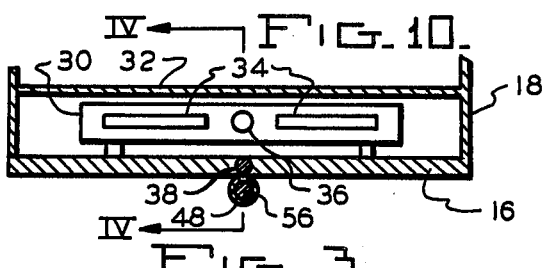
FIG. 3 is a plan, sectional view taken through the access opening panel along Section III—III of FIG. 2, illustrating the magnetic field influencing device in operating position.
FIG. 10 is a diagram of an electrical circuit which may be used in conjunction with the inventive concept.
Figure 4:
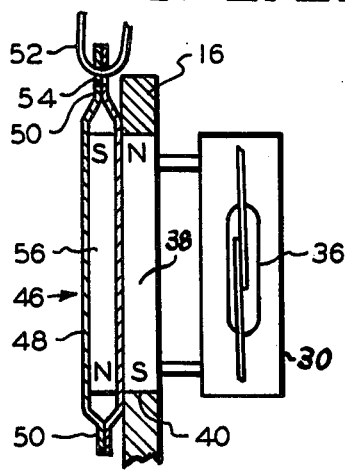
FIG. 4 is an enlarged, detailed, elevational sectional view of the panel and associated structure as taken along Section IV—IV of FIG. 3.
Figure 6:
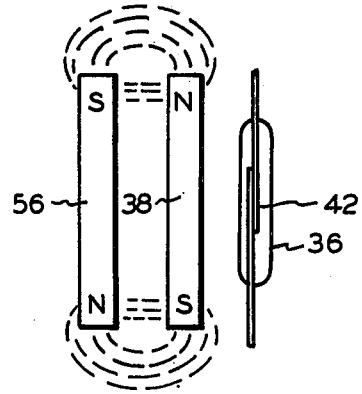
FIG. 6 is a schematic view of the biasing switch, reed switch, and an animal-worn permanent magnet so oriented as to permit the reed switch contacts to close.

In the arrangement shown in FIGS. 1, 3 and 4 a permanent bar magnet 56 is mounted within the tubular casing 48 having an upper pole of an opposite polarity to the upper pole of the biasing magnet 38 as indicated in FIG. 4. In the drawings the polarity of the magnet ends are indicated by the letters "N" and "S" for purpose of illustration and description. Thus, when the animal inserts its head into the feed trough 12 as shown in FIG. 1 the magnet 56 will be disposed adjacent the biasing magnet 38, and as opposite poles will be disposed adjacent each other the biasing magnet 38 will draw the casing 48 against the panel 16 as illustrated in FIG. 4. In this relationship, the magnet 56 will attract the magnetic field of the biasing magnet 38 to produce a magnetic field as schematically indicated in FIG. 6, modifying the normal field of biasing magnet 38 from that as illustrated in FIG. 5.

When the magnetic field of biasing magnet 38 is attracted to the magnet 56 worn by the animal the magnetic field is sufficiently removed from the contacts 42 of the reed switch 36 to permit the reed switch contacts to close which energizes motor 28 to rotate screw auger 24 and deliver feed to the trough. Delivery of feed to the trough 12 continues as long as the animal retains its head within the feed trough and the magnet 56 adjacent the biasing magnet 38, and upon withdrawal of its head from the access opening 14 the magnetic field of biasing magnet 38 will be restored to the condition shown in FIG. 5 opening the contacts of switch 36 de-energizing motor 28.

Figure 7:
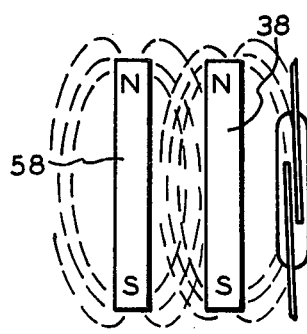
FIG. 7 is a view similar to FIG. 6 illustrating the animal-worn magnet so oriented as not to influence the magnetic field imposed upon the reed switch.

If an animal inserts its head into the access opening 14 wherein the bar magnet 58, FIG. 7, within the casing 48 is oriented such that the magnet pole at the upper end of the casing is of the same polarity as the pole at the upper end of the biasing magnet 38, the magnets 58 and 38 will repel each other, and the magnetic field influencing the contacts of switch 36 will not be removed from the switch, and the switch contacts remain open. Thus, when an animal carrying a permanent magnet so vertically oriented as shown in FIG. 7 inserts its head into the feed dispenser having a biasing magnet oriented as in FIG. 7 feed will not be dispensed.

Figure 9:
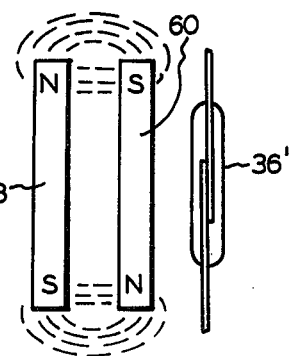
FIG. 9 is a schematic view of the biasing magnet and reed switch used with the other feed dispenser with respect to the arrangement shown in FIGS. 4–8, upon an animal worn magnet being disposed adjacent thereto permitting the reed switch contacts to close.

However, in the second dispenser 10' the switch biasing magnet 60, FIG. 9, will be disposed in a vertical orientation having an opposite polarity at the upper magnet end with respect to the biasing magnet orientation in the first dispenser 10, as shown in FIG. 5. Thus, an animal wearing a bar magnet 58 oriented as shown in FIGS. 7 and 9 will, upon insertion of its head into the feed trough 12, cause the magnetic field of the biasing magnet 60 to be drawn away from the reed switch 36' permitting the contacts thereof to close energizing the associated feed dispensing motor and provide supplemental feed from the second dispenser to the animal.

From the aforementioned description it will be appreciated that merely by using biasing magnets having different upper polarities with the two dispensers in conjunction with animal-worn magnets having different upper polarities it is possible to readily selectively determine which of the two dispensers will provide feed for a given animal.

Figure 8:
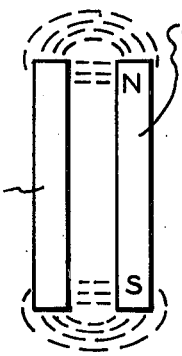
FIG. 8 is a schematic view of the biasing magnet and reed switch, and a magnetic field conducting bar, illustrating the conduction of the magnetic field therethrough.

If it is desired to permit a given animal to obtain feed from both automatic supplemental feed dispensers 10 and 10' the animal wears an elongated bar of magnetic field conducting material, such as a ferrous metal, as represented at 62 in FIG. 8. This bar 62 may be placed within a casing, and is preferably of a length substantially corresponding to the length of the biasing magnets 38 and 60. Upon an animal wearing the bar 62 inserting its head into the feed trough 12 the magnetic field of the biasing magnet 38 will be diverted, as shown in FIG. 8, away from the contacts of the reed switch 36 permitting the reed switch to close and energize the motor 28. Of course, as the bar 62 is "neutral" it will effectively function to "short" the magnetic field of the biasing magnet regardless of the orientation of the poles of the switch biasing magnet, and the bar will actuate both feed dispensers.

FIG. 10 illustrates a typical circuit which may be used in the practice of the invention. A 110 volt supply is connected to conductors 64 and 66, conductor 64 being the ground, and a triac 68 Model T2800 as manufactured by RCA Corporation is connected across the conductor 66 and the motor conductor 70. The reed switch 36 is connected across the conductor 70 and the gate of the triac 68 through a resistance 72, whereby closing of the contacts of the reed switch permits the flow of current through the motor 28 for the energization thereof. The resistance 74 and condensor 76 function as a voltage snubber to retard the switching action of the triac to avoid internal damage thereto, and resistance 72 limits the gate current.

It is preferred that the length of the biasing magnets 38 and 60 are substantially equal to each other and to the length of the magnets 56 and 58 and the bar 62 whereby the magnetic fields will be substantially as described. While these dimensional relationships may vary within limits and still provide the desired operation, the proper functioning does require such orientation between the biasing magnets and magnetic field influencing means as to control the switch influencing magnetic fields as described as will be apparent to those skilled in the art.

In the previous embodiment the reed switch illustrated is of the normally closed contact type. However, it is possible to use the concepts of the invention with a reed switch wherein the contacts are normally open and are biased to a closed condition upon being subjected to a magnetic field of predetermined sufficient strength. Such a normally open reed switch embodiment is shown in FIGS. 11-13. In FIG. 11, schematically illustrated, the reed switch 78 includes normally open contacts 80, which will be biased to a closed condition when subjected to a magnetic field of sufficient density. In FIG. 11, the biasing magnet 82 is mounted adjacent the switch 78, as in the panel 16, and the proximity of the biasing magnet to the switch imposes a magnetic field upon the switch contacts 80. However, the magnetic field produced by the biasing magnet 82 is of insufficient density to close the contacts 90, and the contacts will remain open in the "normal" condition as represented in FIG. 11. In the other dispenser the biasing magnet upper pole will be of the opposite polarity with respect to magnet 82 to permit the desired selective operation.

Upon an animal inserting its head into the feed trough 12 the animal-worn magnet, represented at 84 in FIG. 12, will be disposed adjacent the plate 16, and in proximity to the biasing magnet 82. Assuming the upper polarity of the animal-worn magnet 84 to be the same as the upper polarity of the biasing magnet the presence of the magnet 84 will intensify the magnetic field imposed upon the switch 78 and the contacts 80, and close the contacts to energize the motor 28 permitting feed to be dispensed to trough 12. Feed dispensing will occur as long as the animal retains its head within the feed trough producing the high density magnetic field imposed upon contacts 80. Upon the animal withdrawing its head from the feed trough the conditions at the switch and biasing magnet will be as shown in FIG. 11 permitting the switch contacts 80 to reopen de-energizing transfer motor 28.

If the animal inserting its head into the feed trough is wearing a magnet having an upper polarity dissimilar to the upper polarity of the biasing magnet 82, a condition exists as represented in FIG. 13 wherein the animal-worn magnet 86 will be disposed adjacent the biasing magnet. In this relationship the biasing magnet field is attracted to the animal-worn magnet 86 substantially reducing the magnetic field acting on the switch contacts 80, and the switch 78 will remain open preventing feed dispensing.

With the arrangement shown in FIGS. 11-13 feed will be dispensed from the associated dispenser only when the upper poles of the biasing and animal-worn magnets are similar wherein a higher density magnetic field is imposed upon the switch contacts to close the same. In this arrangement universal operation of both dispensers by an animal-worn ferrous bar, for instance, is not possible as the magnetic field will be as shown in FIG. 8 which removes the magnetic field from the reed switch, and the switch contacts will remain open and no feed dispensing will occur.

The concepts of the invention may be utilized with switches other than reed switches, and embodiments utilizing micro-switches are illustrated in FIGS. 14–19. In FIGS. 14–16 a micro-switch 88 is illustrated which is actuated by a lever arm 90 pivotally mounted upon the micro-switch and the position of the lever arm is sensed by a spring biased button 92 mounted within the micro-switch body. The switch contacts, not shown, are within the micro-switch body operated by the position of the button 92, and the switch of this embodiment is normally open.

In an arrangement wherein micro-switch actuation is to be achieved by repulsion magnetic forces, as described with respect to FIGS. 14–16, the switch 88 will be of the normally open type wherein the lever arm 90 is biased to the left, in a clockwise direction about its pivot, by the spring biased actuator button 92 and sufficient movement of the button to the right will close the switch contacts. An elongated permanent bar magnet 94 is mounted upon the lower portion of the arm 90, and is vertically oriented wherein poles of opposite polarity constitute the upper and lower ends. The switch 88 and magnet 94 are mounted within the feed trough 12 at a location corresponding to the casing 30 in the previously described embodiment, and the switch mechanism will be located within the housing 32 so as not to be disturbed during the animal feeding.

The panel mounted biasing magnet 96 is disposed parallel to and in proximity to the magnet 94 as apparent in FIG. 14, and the upper pole of the biasing magnet is of a like polarity to the upper pole of magnet 94, whereby a repelling force will be imposed upon magnet 94 and arm 90 attempting to force the arm against the spring biased button 92. However, the spring force on the button is sufficient to prevent movement of the arm to such an extent as to produce switch contact actuation, and under the normal conditions shown in FIG. 14 the contacts of switch 88 will be open.

Upon an animal inserting its head into the feed trough 12 and disposing the animal-worn magnet 98 adjacent the biasing magnet 96, as shown in FIG. 15, and wherein the upper polarity of the magnet 98 is similar to the polarity of the magnets 94 and 96, the magnetic field imposed upon the magnet 94 will now be increased in density and force, and this force is sufficient to overcome the spring biasing action of button 92 and magnet 94 and arm 90 will be displaced to the right a sufficient distance to close the contacts of switch 88 and energize the feed dispensing motor 28. Thus, it will be appreciated that the mode of operation is somewhat similar to that described with respect to FIG. 12.

If the animal-worn magnet 100 has its poles so vertically oriented that the upper pole is of an opposite polarity with respect to the upper pole of the biasing magnet 96, as represented in FIG. 16, a shorting of the magnetic field of the biasing magnet occurs removing the field from significant influence on the switch magnet 94, and there will be no movement of the arm 90 to the right, and the switch contacts will remain open, as in FIG. 14. Of course, as in the previous embodiments, two feed dispensers are used and in order to provide selected operation by given animals the other dispenser will have the poles of its switch magnet and biasing magnet vertically reversed from the relationship shown in FIG. 14 so that an animal wearing the magnet 100 will actuate said other feed dispenser, and magnet 98 will not activate the same.

With the magnet and switch operation as described with respect to FIGS. 14–16 wherein switch actuation only occurs upon creating a higher density magnetic field, the animal may selectively feed from either of the feed dispensers, but not both. To substitute a ferrous bar for the animal-worn magnet will produce a shorting of the magnetic field of the biasing magnet, similar to that shown in FIG. 16, and dispensing motor actuation will not occur.

In the embodiment of FIGS. 17–19 the micro-switch 102 includes an arm 104 having vertically oriented bar magnet 106 mounted thereon in a manner similar to the previously disclosed embodiment. However, switch 102 includes contacts controlled by the spring biased actuating button 108 which close upon the magnet 106 and arm 104 moving to the left, rather than to the right as in FIGS. 14–16. In this embodiment the biasing magnet 110 mounted within panel 16 has a upper polarity similar to the magnet 106, whereby a repelling force is imposed upon the magnet 106 in the normal condition in a situation identical to that illustrated in FIG. 14. The repelling force imposed upon the magnet 106 is sufficient to prevent movement of the arm 104 to the left to a contact closing condition. Upon the animal-worn magnet 112 being disposed adjacent the biasing magnet 110 the repelling forces imposed upon the magnet 106 become even greater, FIG. 17, and the magnet 106 will be held in its right-most position maintaining the switch contacts open and no feeding will occur.

Animals which are to be fed by a dispenser control constructed in accord with the embodiment of FIGS. 17–19 will wear a magnet 114 having an upper pole of opposite polarity to the upper pole of the biasing magnet 110, as shown in FIG. 18, or the animal may wear an elongated bar of magnetic field conducting material, such as ferrous metal, as represented at 116 in FIG. 19. When wearing the magnet 114, insertion of the animal head into the feed trough will produce a shorting or attraction of the magnetic field of biasing magnet 110 removing the repelling force imposed upon the switch magnet 106, and permitting the spring biased button 108 to move the magnet and arm 104 to the left to close the switch contacts and initiate feed motor operation. Likewise, if the animal is wearing the ferrous bar 116 the magnetic field of the biasing magnet 110 is removed from the switch magnet 106 permitting the switch magnet to move to the left and close the motor circuit. Of course, in this embodiment, an animal wearing the ferrous bar 116 will be capable of operating two dispensers wherein the difference between the dispensers merely lies in the vertical orientation of the poles of the switch and biasing magnets. For instance, in a two-dispenser system utilizing the concepts of the embodiment of FIGS. 17–19 the other dispenser will locate the "south" poles of the switch and biasing magnets at the upper end of the magnets wherein an animal having a magnet with an upper "north" pole may feed from the dispenser, but not the other as represented in FIG. 17. The ferrous bar 116 will permit universal operation of both dispensers regardless of the pole orientation of the biasing and switch magnets.

In the above description the biasing magnets, the animal worn magnets and bar, and the switch mounted magnets have been described as being oriented in a vertical manner, and it is to be understood that the concepts of the invention can be practised with the magnets and bar oriented in any direction as long as they are related in a predetermined common direction. For instance, the length of the magnets and bar may be horizontally disposed, and in such instance the necklace and structure supporting the animal worn magnet or bar must be such to hold the magnet horizontal with the poles located in the desired position.

It is also to be appreciated that switches responsive to magnetic fields other than those described may be used within the scope of the invention, and micro switches may be used wherein a ferrous material may be located on the switch actuating arm, rather than a magnet.

It will therefore be appreciated that the practice of the invention permits economical selective animal feeding apparatus to be readily manufactured which requires little maintenance. The use of the biased switch arrangement permits a pair of similar feed dispensers to selectively dispense feed to desired animals of the herd, and the magnetic influencing device worn by the animal is of such a nature as to be relatively foolproof in operation and not subject to damage or malfunctioning. Merely by changing the polar orientation or material of the magnetic influencing device worn by the animal it is possible to permit the animal to feed from either dispenser, or both dispensers, and the invention provides a versatility at a lower cost and greater dependability than selective feeder devices previously available.

It is appreciated that modifications to the inventive concepts may be apparent to those skilled in the art without departing from the scope of the invention.

I claim:

1. A selective animal feeder system for feeding selected animals of a group from a feed dispenser comprising in combination, a feed trough having an animal head access opening, a feed storage container, electrically energized feed transfer means selectively transferring feed from said container to said trough during energization of said transfer means, proximity operated feed transfer control means located adjacent said head access opening controlling operation of said feed transfer means, said control means including an electric switch operable by the influence of magnetic field forces between open and closed conditions located adjacent said access opening, a permanent biasing magnet adjacent said access opening and switch operably related to and biasing said switch having first and second poles of opposite polarity in spaced relation, the poles of said biasing magnet being related to said access opening in a predetermined manner, a second permanent magnet having first and second poles of opposite polarity in a spaced relation substantially corresponding to the spaced relation of the poles of said biasing magnet and adapted to be worn by the animal to be fed and oriented on the animal in a predetermined manner whereby said poles of said second magnet will be oriented to said access opening and biasing magnet in a predetermined manner upon the animal inserting its head within said opening, said switch being selectively operated to said open and closed conditions upon the animal inserting its head within said opening to locate said second magnet within the magnetic field of said biasing magnet in dependence upon the relationship of the polarity of the poles of said magnets.

2. In a selective animal feeder system as in claim 1 wherein said biasing and second magnets comprise elongated bar magnets of substantially equal length having poles at opposite ends, the length of both magnets being oriented in a common direction.

3. In a selective animal feeder system as in claim 1 wherein said switch comprises a reed switch having contacts operable by a magnetic field and said biasing magnet is mounted adjacent said access opening in proximity to said reed switch influencing said switch contacts.

4. In a selective animal feeder system as in claim 1 wherein said switch includes an actuating arm operatively movably in a direction toward and away from said second magnet when the animal head is within said opening, a third permanent magnet being mounted upon said arm whereby magnetic field forces imposed upon said biasing magnet by said second magnet affect the magnetic field imposed on said third magnet to selectively operate said switch.

5. In a selective animal feeder system as in claim 4 wherein said biasing and third magnets comprise elongated bar magnets of substantially equal length having poles at opposite ends, the length of both magnets being oriented in a common direction.

6. A selective animal feeder system for feeding selected animals of a group from first and second feed dispensers comprising, in combination, first and second feed troughs each having an animal access opening, first and second feed storage containers, first and second electrically energized feed transfer means selectively transferring feed from said first container to said first trough and from said second container to said second trough, respectively, during energization of the associated transfer means, first and second proximity operated feed transfer control means each including an electric switch operably influenced by a magnetic field between open and closed conditions located adjacent its associated animal access opening, a permanent biasing magnet adjacent each switch having first and second poles of opposite polarity in spaced relation and located adjacent its associated access opening, the poles of said biasing magnets being related to its associated opening in a predetermined manner, second permanent magnets each having first and second poles of opposite polarity in a spaced relation substantially corresponding to the spaced relation of the poles of said biasing magnets and adapted to be worn by the animal to be fed and oriented on the animal in a predetermined manner whereby said poles of said second magnets will be oriented to the associated access opening and the associated biasing magnet in a predetermined manner upon the animal inserting its head within the associated opening, said switches being selectively operated to said open and closed conditions by the magnetic field imposed thereon upon the animal inserting its head within an opening to locate a second magnet within the magnetic field of the adjacent biasing magnet in dependence upon the relationship of the polarity of the poles of the adjacent magnets.

7. In a selective animal feeder system as in claim 6 wherein said biasing and second magnets comprise elongated bar magnets of substantially equal lengths having poles at opposite ends, the lengths of both magnets being oriented in a common direction.

8. In a selective animal feeder system as in claim 7 wherein said switches each include an operating arm movable in a direction toward and away from the adjacent biasing magnet, a third permanent elongated bar magnet mounted upon each switch arm having poles of opposite polarity at each end, the length of said third magnets being oriented in said common direction, the magnetic field forces imposed upon said third magnets by the adjacent biasing and second magnets operating said switches in dependence upon the relationship of the polarity of the poles of said biasing and second magnets upon a second magnet being disposed adjacent a biasing magnet upon an animal inserting its head into said access opening.

9. A selective animal feeder system for feeding selected animals of a group from first and second feed dispensers comprising, in combination, first and second feed troughs each having an animal access opening, first and second feed storage containers, first and second electrically energized feed transfer means selectively transferring feed from said first container to said first trough and from said second container to said second trough, respectively, during energization of the associated transfer means, first and second proximity operated feed transfer control means each having a reed switch having normally closed contacts movable between open and closed positions under the influence of a magnetic field and a switch being located adjacent each access opening, first and second permanent magnets having poles of opposite polarity producing a magnetic field, a magnet being located adjacent each switch, said switch contacts being biased open by the magnetic field of the adjacent magnet, magnetic field influencing means adapted to be worn by the animals to be fed and located adjacent said permanent magnets upon the animal inserting its head into a said trough through an access opening selectively diverting said associated magnetic field from the associated reed switch permitting the switch contacts to close energizing the associated feed transfer means, said magnetic field influencing means selectively comprising a neutral magnetic field conductor or a permanent magnet, said permanent magnet magnetic field influencing means being oriented in a predetermined manner on the associated animal to selectively influence the magnetic field of only one of said first or second permanent magnets to permit the associated switch contacts to close, and said neutral magnetic field conductor influencing the magnetic field of both said first and second permanent magnets to permit the associated switch contacts to close.

10. In a selective animal feeder system as in claim 9 wherein said first and second permanent magnets comprise elongated bar magnets having poles at the opposite ends and said magnets are vertically oriented, said first magnet having an upper pole of one polarity and said second magnet having an upper pole of the opposite polarity, said magnetic field influencing means including vertically oriented bar magnets having poles at opposite ends selectively having upper poles of opposite polarity.

* * * * *